United States Patent [19]
Brooker et al.

[11] Patent Number: 6,147,798
[45] Date of Patent: *Nov. 14, 2000

[54] MICROSCOPE ATTACHMENT FOR HIGH PRECISION AND EFFICIENT IMAGING

[75] Inventors: Gary Brooker, Potomac; Scott McDonald, Germantown, both of Md.; Gregory Adams, Manassas; Jeff Brooker, Herndon, both of Va.

[73] Assignee: Atto Instruments, LLC., Rockville, Md.

[ * ] Notice: This patent issued on a continued prosecution application filed under 37 CFR 1.53(d), and is subject to the twenty year patent term provisions of 35 U.S.C. 154(a)(2).

[21] Appl. No.: 08/957,454
[22] Filed: Oct. 24, 1997
[51] Int. Cl.$^7$ .................................................. G02B 21/00
[52] U.S. Cl. ........................................... 359/368; 359/389
[58] Field of Search .................................... 359/368, 385, 359/389, 234, 235

[56] References Cited

U.S. PATENT DOCUMENTS

| | | | |
|---|---|---|---|
| 4,927,254 | 5/1990 | Kino et al. | 359/235 |
| 5,161,052 | 11/1992 | Hill | 359/377 |
| 5,235,457 | 8/1993 | Lichtman et al. | 359/368 |
| 5,633,751 | 5/1997 | Tanaami et al. | 359/368 |
| 5,701,197 | 12/1997 | Yano | 359/389 |

OTHER PUBLICATIONS

"Documents from Technical Instrument Company" Internet Site WWW.technical.com on Oct. 23, 1997.
"A modified confocal laser scanning microscope allows fast ultraviolet ratio imaging of intracellular Ca2+ activity using Fura–2" by R Nitschke et al, Pflugers Arch –Eur J Physiol 1997 pp. 653–663.

Primary Examiner—Cassandra Spyrou
Assistant Examiner—Mark A. Robinson
Attorney, Agent, or Firm—Oblon, Spivak, McClelland, Maier & Neustadt, P.C.

[57] ABSTRACT

A novel attachment for a microscope to be coupled to an optical coupling tube of a microscope. The attachment for a microscope includes a light source generating a quasi-collimated light output. Elements are provided for reflecting the light output from the light source towards a specimen in the microscope. Further, elements are provided for propagating a reflection of the light output from the light source from the specimen to a viewing point. The elements for achieving the reflecting and the elements for achieving the propagating may each include a spinning Nipkow disk and a dichroic mirror. The quasi-collimated light output from the light source directly impinges on the Nipkow disk, i.e., without being focused on the Nipkow disk and without passing through a lens. A right angle mirror can also be positioned as one of the elements for achieving the reflecting and the propagating.

18 Claims, 4 Drawing Sheets

MICROSCOPE ATTACHMENT FOR HIGH PRECISION AND EFFICIENT IMAGING

BACKGROUND OF THE INVENTION

1. Field of the Invention

The present invention is directed to an attachment for a microscope which imparts improved resolution and which allows a high precision and efficient imaging of a specimen.

2. Discussion of the Background

Confocal microscopy is established as a technique used in a great number of laboratories. Confocal optical microscopes, and particularly scanning confocal optical microscopes, are known for having an extremely short depth of focus and improved transverse resolution. A confocal optical microscope includes an internal light source to illuminate an object.

Confocal microscopes, however, are very expensive any may have only certain limited applications. Therefore, it would be beneficial to provide a confocal attachment to a standard microscope which would allow confocal microscopy in conjunction with the standard microscope. Such a confocal attachment would have its own internal light source. One example of such a background confocal attachment is the Zeiss CSM shown schematically in FIG. 4.

The confocal attachment of FIG. 4 connects to a standard optical microscope and includes a tube head 141 as an output viewing point with certain optical elements. The standard optical microscope is shown as elements 161–163 in FIG. 4. Element 162 is a tube lens which focuses light onto a specimen 163. Light reflected off the specimen 163 is output to a standard viewing point 161 of the standard microscope.

The confocal attachment of FIG. 4 provides a way to illuminate the specimen 163 from light output from a light source 149. The specimen 163 can then be viewed at the output of the tube head 141 or at a television output 145 through a TV selector 147

With this confocal attachment, light is output from the light source 149, which for example may be a halogen or HBO light source. The output light from light source 149 passes through a motorized aperture diaphragm 151 and a filter 153. The output light then continues and passes through a focusing lens 156. The light passing through this focusing lens 156 then impinges on a motorized beam splitter 155 which is designed to reflect the output light from the light source 149 towards a removable spinning disk 157. The lens 156 is chosen such that the light output from the light source 149 focuses onto the removable spinning disk 157. The light focused on the spinning disk 157 then passes through the removable spinning disk 157 to reflect off an autofocus sensor 159 (which is optional). The light then reflects off the autofocus sensor 159 through a tube lens 162 to impinge on a sample 163.

The reflected light off of sample 163, which is an image of the sample 163, then follows a return path through tube lens 162, off the autofocus sensor 159, to be again focused on the spinning disk 157. This reflected light then passes through the motorized beam splitter 155 (beam splitter 155 is designed to pass the reflected excitation light from sample 163, which is at a different wavelength than the emission light output from light source 149), through a further beam splitter 143, and through further optical elements to the tube head 141 where the image of the sample can then be viewed.

This confocal attachment for a standard microscope as shown in FIG. 4, however, suffers from some significant drawbacks.

First, this confocal attachment focuses the emission light output from the light source 149 onto the spinning disk 157 through focusing lens 156. This ensures that the emission light is focused on a spinning disk 157, but also results in introducing the focusing lens 156 through which significant optical transmission losses arise.

Further, a drawback with the confocal attachment of FIG. 4, and other confocal microscopes, is chromatic aberration. In confocal microscopy, since sub-micron dimensions are being imaged, chromatic aberration (i.e. the diffraction of the color components of a light source by different amounts) becomes a significant problem. Chromatic aberration is introduced any time that a light source is focused. In the confocal attachment of FIG. 4, light from the light source 149 is focused by both focusing lens 156 and tube lens 162. As a result, two instances of introducing chromatic aberration result in the confocal attachment of FIG. 4. Correcting such chromatic aberration requires rendering the optics in the confocal attachment of FIG. 4 more complicated.

Further, the confocal attachment of FIG. 4 includes a complicated and lengthy optical path including several optical elements provided for propagating the light generated from the light source 149 and propagating the light reflected off the sample 163. The use of such a large number of optical elements results in great optical transmission loss in the imaging of the sample.

SUMMARY OF THE INVENTION

Accordingly, one object of the present invention is to provide a novel microscope attachment, which may find particular application in a confocal optical microscope, which is simple, small in size and which allows a high precision and efficient imaging of a specimen.

A further object of the present invention is to provide a novel microscope attachment which minimizes the effect of any stray light.

A further object of the present invention is to provide a novel microscope attachment which minimizes the number of optical elements, to thereby reduce any optical transmission loss.

The present invention achieves these noted and other objects by providing a novel attachment for a microscope to be coupled to an optical coupling tube of the microscope. The novel attachment for a microscope of the present invention includes a light source generating a quasi-collimated light output. Elements are provided for reflecting the light output from the light source towards a specimen in the microscope. Further, elements are provided for propagating a reflection of the light output from the light source from the specimen to a viewing point. The elements for achieving the reflecting and the elements for achieving the propagating may each include a spinning Nipkow disk and a dichroic mirror. The quasi-collimated light output from the light source directly impinges on the Nipkow disk, i.e. without being focused on the Nipkow disk and without passing through a lens. A right angle mirror can also be positioned as one of the elements for achieving the reflecting and the propagating.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
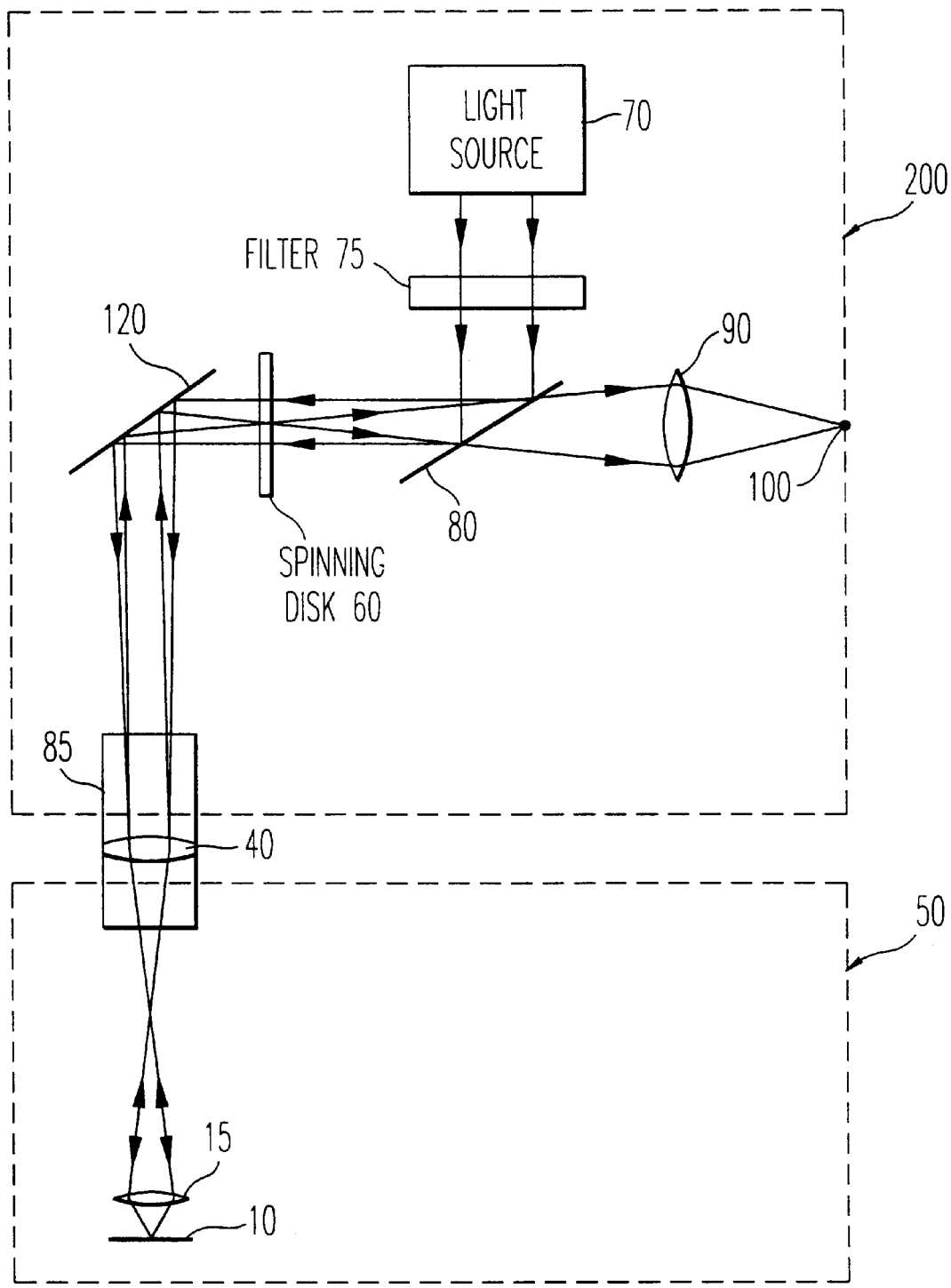
FIG. 1 shows a first embodiment of the present invention.

Referring now to the drawings, wherein like reference numerals designate identical or corresponding parts throughout the several views, and more particularly to FIG. 1 thereof, a first embodiment of the present invention is shown in schematic detail.

The present invention is directed to an attachment 200 for a microscope 50. The microscope 50 can, as one example only, be a Zeiss AXIOVERT 135.

The microscope 50 includes a specimen 10 which is illuminated with light from a light source (not shown) internal to the microscope 50 through an objective lens 15. An image of the specimen 10 then passes through the objective lens 15 to a viewfinder (not shown) of the microscope 50 to view the specimen 10.

The confocal module attachment 200 of the present invention is a confocal module which results in using the standard microscope 50 as a confocal microscope in instances when confocal microscopy is desired. The microscope 50 can be designed to operate with certain attachments, and thus includes an output to which an optical coupling tube 85 which allows an image of the specimen 10 to be output therefrom can be connected. The confocal module attachment 200 includes the output optical coupling tube 85 to connect to an output of the microscope 50. The optical coupling tube 85 includes a specifically designed lens 40, as discussed in further detail below.

According to a first embodiment of the present invention as shown in FIG. 1, the confocal module attachment 200 includes a right angle mirror 120, a spinning disk 60, which may preferably take the form of a Nipkow disk, a dichroic mirror 80, a focusing lens 90, and a viewing point 100. The confocal module attachment 200 of the present invention also includes a light source 70. The light source 70 differs from a light source internal to the microscope 50 to thereby allow different illumination of the specimen 10. This light source 70 may, as one example, take the form of a 100 watt HBO mercury arc lamp. An output of this light source 70 initially passes through a filter 75.

The confocal module attachment 200 of the present invention is particularly adapted to work in fluorescence in which a dye, such as Fura-2 or fluorescein, coats the specimen 10. In such an operation excitation light from the light source 70 differs in wavelength from emission light reflecting off the specimen 10. The filter 75 is selected to ensure a proper wavelength of the excitation light. As a specific example, when Fura-2 is utilized as the dye for the specimen 10, the filter 75 may be chosen to pass only excitation light with a wavelength of 334 nm, and this results in emission light from the specimen 10 having a wavelength greater than 500 nm. If fluorescein is utilized as the dye for the specimen 10, the filter 75 may be chosen to pass only excitation light with a wavelength of 488 nm, which results in emission light from the specimen 10 having a wavelength greater than 500 nm.

The device of the present invention as shown in FIG. 1 operates as follows. The light source 70 generates quasi-collimated excitation light which is filtered by filter 75 to let only light of a desired wavelength to pass. The light which passes through the filter 75 then reflects off dichroic mirror 80, passes through the spinning disk 60 and then reflects off the right angle mirror 120. The dichroic mirror 80 is designed to reflect this wavelength of excitation light and to pass the wavelength of reflected emission light. The excitation lights then passes through the optical coupling tube 85, including the tube lens 40, and objective lens 50 onto the specimen 10. The excitation light then reflects off the specimen 10, to thereby provide an image of the specimen 10 as emission light. The emission light then passes again through the objective lens 15 and through the tube lens 40 of the optical coupling tube connector 85. The emission light reflected from the specimen 10 then further proceeds off the right angle mirror 120, through the spinning disk 60, through the dichroic mirror 80 (which again passes light of the emission light wavelength), through the focusing lens 90 and onto the viewing point 100.

Figure 4:
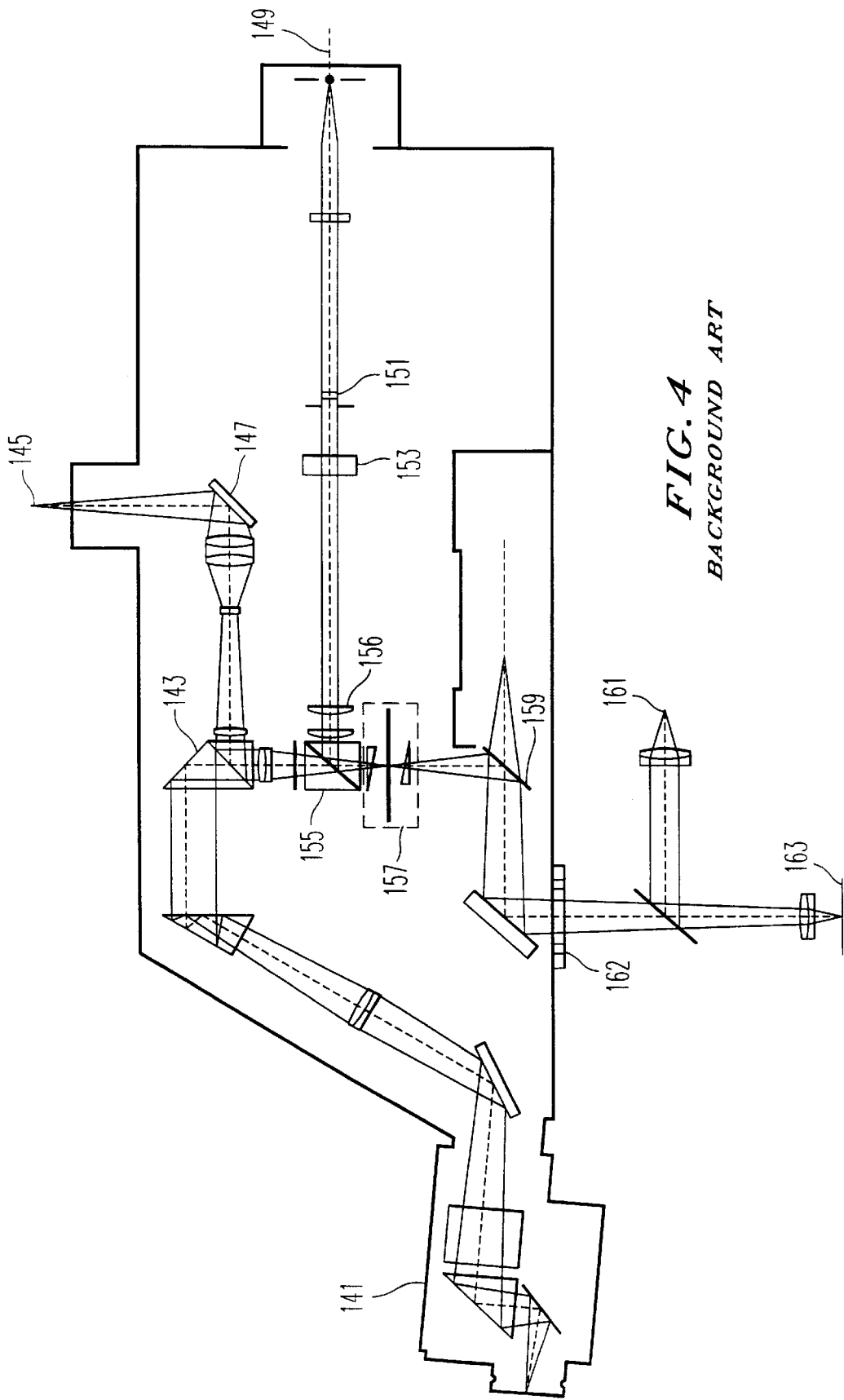
FIG. 4 shows a background confocal attachment for a standard microscope.

One of the significant features of the present invention is that the light output from the light source 70 is quasi-collimated light and it is this quasi-collimated light which passes through the spinning disk 60. Stated another way, the confocal module attachment 200 of the present invention does not focus the light from the light source 70 onto the spinning disk 60, but instead allows quasi-collimated light to pass through the spinning disk 60. As a comparison, the background art of FIG. 4 focuses the light from the light source 149 onto the spinning disk 157 through a focusing lens 156. However, the utilization of such a focusing lens 156 introduces optical losses into the emission light in the background art of FIG. 4. In the confocal module attachment 200 of the present invention, instead of focusing light from the light source 70 onto the spinning disk 60, quasi-collimated light passes through the spinning disk 60, to thereby avoid optical transmission losses which would result if the light from the light source 70 was focused onto the spinning disk 60 through a focusing lens.

This provides a further significant benefit in the present invention in that it limits chromatic aberration is limited, thereby allowing simpler optics in the present invention. As discussed above, chromatic aberration is introduced when color components of a light source are diffracted differently through focusing lenses. The background art of FIG. 4 introduces chromatic aberration through the focusing lens 156. The confocal microscope attachment 200 of the present invention reduces chromatic aberration by again not including a focusing lens between the light source 70 and the spinning disk 60. By not forming any lenses between the light source 70 and spinning disk 60 chromatic aberration can be minimized in the present invention.

In this way, by not introducing any optical lens elements between the light source 70 and the spinning disk 60, and thereby not focusing an output from the light source 70 onto the spinning disk 60 but conversely allowing quasi-collimated light to pass through the spinning disk 60, optical transmission loss and chromatic aberration can be minimized in the confocal module attachment 200 of the present invention.

Further, in the present invention the positioning and type of the lens 40 and the positioning of the spinning disk 60 are selected so that the excitation light is focused on the specimen 10 and the reflected emission light 15 is focused on the spinning disk 60.

According to a further feature of the present invention, the spinning disk 60 can be slightly offset with respect to the right angle mirror 120. That is, the spinning disk 60 can be positioned such that it is not perpendicular to light reflected from the right angle mirror 120. Such an offset can be very small, for example on the order of 1° 40". This feature of the present invention allows a structure such that light reflecting from a backside of the spinning disk 60, i.e., a side closest to the viewing point 100, does not pass through the dichroic mirror 80 and the focusing lens 90 to the viewing point 100, but instead such reflected light is slightly offset from reflecting on the dichroic mirror 80. This light reflecting off the back side of the spinning disk 60 is thus a cast-off light. The spinning disk 60 must also be positioned a certain distance away from the viewing point 60 to allow the cast-off light to not impinge on the viewing point 100. Such cast-off light does not impinge on the viewing point 100 but instead misses the viewing point 100. Similarly, with such an offset of the spinning disk 60 light reflecting off a front side of the spinning disk 60, i.e., a side closest to the right angle mirror 120, does not impinge on the specimen 10.

The spinning disk 60 is structured such that light only selectively passes therethrough. For example the spinning disk 60 may take the form of a solid disk including slits or small holes. For this reason, a preferable form of the spinning disk 60 is a Nipkow disk.

One of the significant benefits in the present invention is also the overall minimization of optical elements. The use of several optical elements in such a device as in the present invention, e.g., as in the background art of FIG. 4, would significantly limit the power of the output at the viewing point 100. The present invention has been designed to minimize the number of optical elements, and thus to minimize the optical transmission loss associated with each such optical element, to provide a high light output at the viewing point 100.

As is clear from FIG. 1 of the present invention, only one lens, the focusing lens 90, is placed between the spinning disk 60 and the viewing point 100 and no lens or pinhole is positioned between the light source 70 and the spinning disk 60. This minimization of optical elements in the present invention enables achieving high efficiency imaging of sample 10 as discussed above.

The present invention also provides an optical design which works in fluorescence for all dyes which are excited in the ultraviolet range and emit in the visible range, such as Fura-2. Such dyes may typically result in achromatic aberrations and need special corrections with lens systems on both excitation and emission. However, the present invention with its simple optical system does not require special corrections with lenses on both excitation and emission as discussed above.

Figure 2:
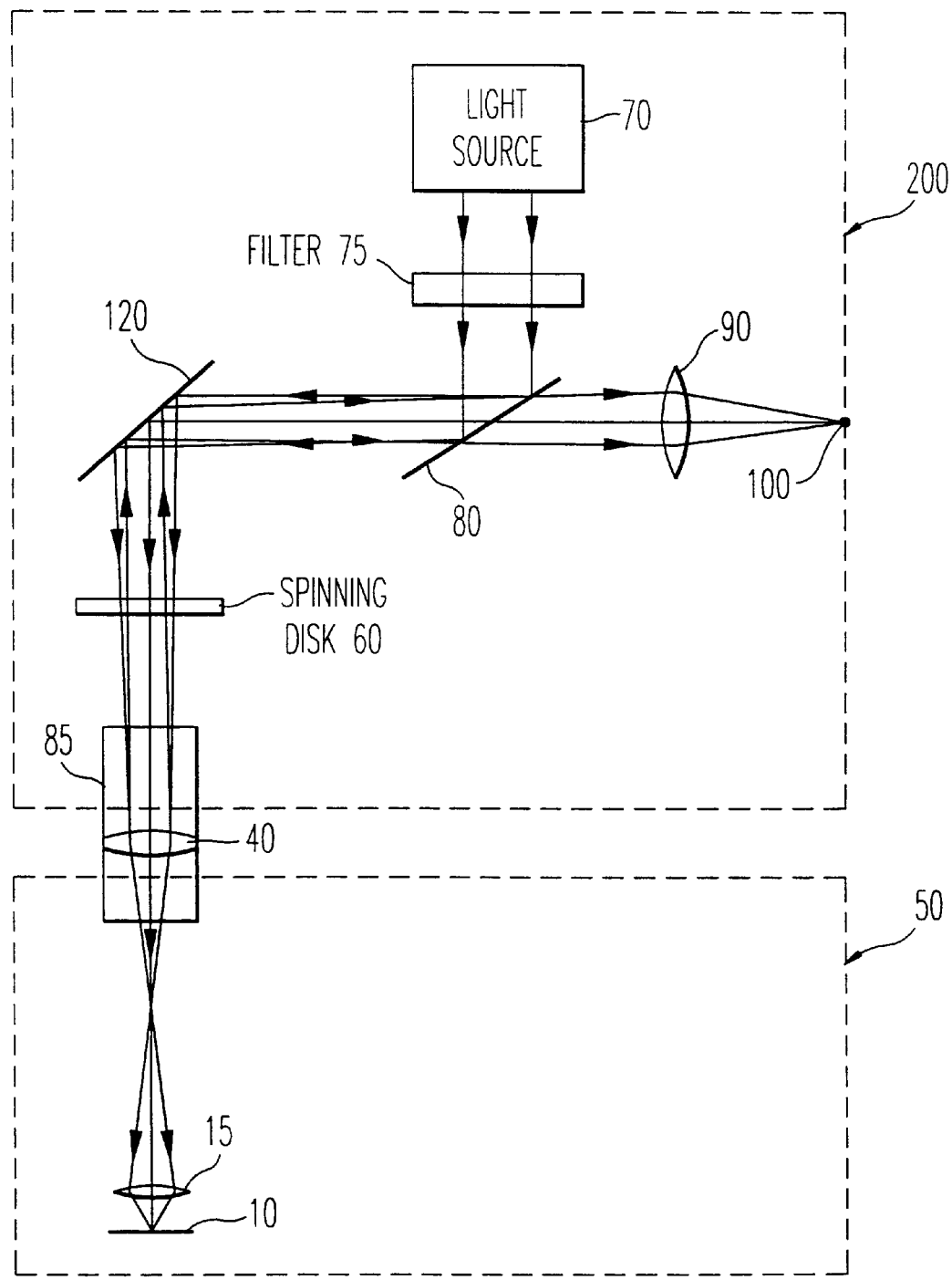
FIG. 2 shows a second embodiment of the present invention.

One possible modification of such a device of the present invention as shown in FIG. 1 is shown in FIG. 2. The device of FIG. 2 is similar to the device of FIG. 1 except that the spinning disk 60, which again is preferably in the form of a Nipkow disk, is positioned between the optical coupling tube 85 and the right angle mirror 120, rather than being positioned between the right angle mirror 120 and the dichroic mirror 80 as in FIG. 1. However, the device of FIG. 2 has a similar overall operation as discussed above with respect to the device of FIG. 1, particular again as quasi-collimated light passes through the spinning disk 60 and as no optical lens elements are formed between the light source 70 and the spinning disk 60.

Each of the devices as shown in FIGS. 1 and 2 have the viewing point 100 at a right angle with respect to the output from the specimen 10 through the tube lens 40. Such a right angle viewing point 100 may often be beneficial from a space point of view in attaching the confocal module attachment 200. For example, the confocal module attachment 200 of FIGS. 1 and 2 can be placed against a wall. However, a further embodiment of the present invention which even further minimizes optical loss is shown in FIG. 3.

Figure 3:
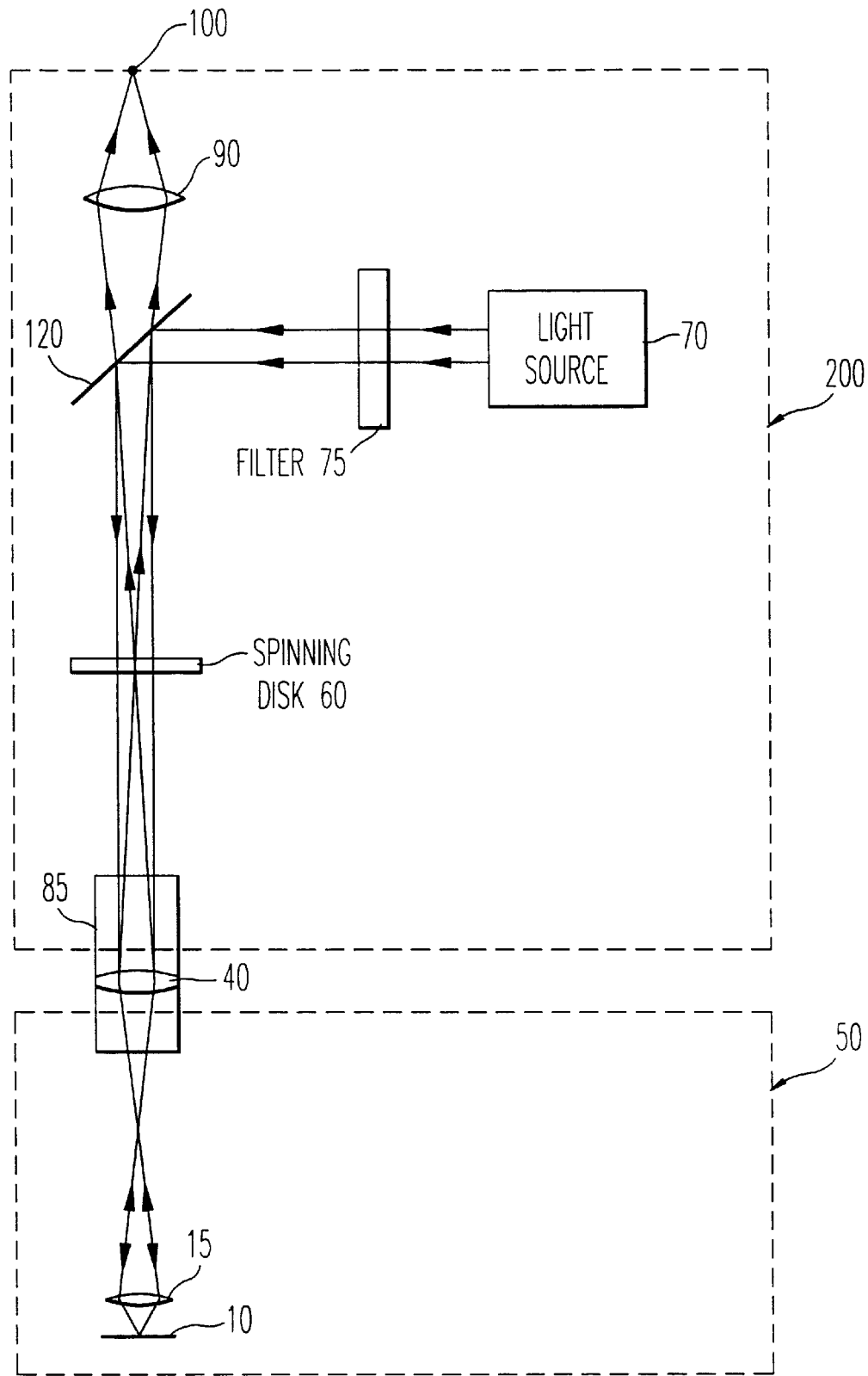
FIG. 3 shows a third embodiment of the present invention.

As shown in FIG. 3, a further embodiment of the present invention eliminates the right angle mirror 120 and has a simple linear output. Again in such a device as shown in FIG. 3 a similar operation as discussed above with respect to the embodiments of FIGS. 1 and 2 is also possible, and the same benefits therein are achieved.

Obviously, numerous additional modifications and variations of the present invention are possible in light of the above teachings. It is therefore to be understood that within the scope of the appended claims, the present invention may be practiced otherwise than as specifically described herein.

What is claimed is:

1. An attachment for a coupling tube of a microscope, the coupling tube including a tube lens, said attachment comprising:

a light source generating a quasi-collimated light output;

means for reflecting the quasi-collimated light output from the light source towards a specimen in the microscope, wherein light output from the light source travels an optical path defined from the light source through the means for reflecting to the tube lens without passing through a focusing lens;

means for propagating a reflection of the light output from the light source from the specimen as a reflected image of the specimen to a viewing point, including a viewpoint focusing lens configured to focus the reflected image onto a viewpoint, the viewpoint focusing lens being positioned outside of the optical path.

2. The microscope attachment according to claim 1, wherein the reflecting means and propagating means common share a spinning disk and a dichroic mirror.

3. The microscope attachment according to claim 2, wherein the spinning disk comprises a Nipkow disk.

4. The microscope attachment according to claim 2, wherein the propagating means further includes a focusing lens formed between the dichroic mirror and the viewing point.

5. The microscope attachment according to claim 2, wherein the propagating means further includes only a single focusing lens formed between the dichroic mirror and the viewing point.

6. The microscope attachment according to claim 1, wherein the propagating means includes a focusing lens.

7. The microscope attachment according to claim 1, wherein the reflecting means and propagating means common share a right angle mirror.

8. The microscope attachment according to claim 7, wherein the right angle mirror is positioned between the spinning disk and the coupling tube.

9. The microscope attachment according to claim 7, wherein the right angle mirror is positioned between the dichroic mirror and the spinning disk.

10. A microscope attachment for a coupling tube of a microscope including a tube lens for focusing light onto a specimen to generate an emission image of the specimen and for focusing the emission image of the specimen, said attachment comprising:

a light source for outputting quasi-collimated excitation light;

a spinning disk through which the quasi-collimated excitation light passes to impinge on the tube lens, and through which the emission image of the specimen passes, wherein light output from the light source travels an optical path defined from the light source through the spinning disk to the tube lens without passing through a focusing lens; and a second focusing lens for focusing the emission image of the specimen passing through the spinning disk onto a viewpoint, the second focusing lens being positioned outside of the optical path.

11. The microscope attachment according to claim 10, further comprising a filter positioned between the light source and the spinning disk to filter the quasi-collimated excitation light to have a predetermined frequency.

12. The microscope attachment according to claim 10, wherein the spinning disk comprises a Nipkow disk.

13. The microscope attachment according to claim 10, further comprising a dichroic mirror formed between the light source and spinning disk.

14. The microscope attachment according to claim 13, wherein the spinning disk comprises a Nipkow disk.

15. The microscope attachment according to claim 10, further comprising a right angle mirror formed between the spinning disk and the tube lens.

16. The microscope attachment according to claim 15, wherein the spinning disk comprises a Nipkow disk.

17. The microscope attachment according to claim 10, further comprising a right angle mirror positioned between the spinning disk and the light source.

18. The microscope attachment according to claim 17, wherein the spinning disk comprises a Nipkow disk.

* * * * *